US006859991B2

United States Patent
Stratico

(10) Patent No.: US 6,859,991 B2
(45) Date of Patent: Mar. 1, 2005

(54) METHODS FOR FORMING STATOR COILS

(75) Inventor: Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 35 days.

(21) Appl. No.: 10/078,190

(22) Filed: Feb. 15, 2002

(65) Prior Publication Data

US 2002/0124382 A1 Sep. 12, 2002

Related U.S. Application Data

(60) Provisional application No. 60/270,302, filed on Feb. 20, 2001.

(51) Int. Cl.[7] .................. H02K 15/00; H02K 15/14; H02K 15/16
(52) U.S. Cl. .................. 29/596; 29/273; 29/564.6; 29/596; 29/606; 29/735; 29/736; 310/214; 310/215
(58) Field of Search ................ 29/596, 273, 564.6, 29/606, 735, 736; 310/214, 215, 217

(56) References Cited

U.S. PATENT DOCUMENTS

| 4,205,429 A | * | 6/1980 | Fooyontphanich et al. ... 29/596 |
| 4,455,743 A | * | 6/1984 | Witwer et al. ................ 29/596 |
| 4,750,258 A | * | 6/1988 | Anderson .................... 29/596 |
| 4,991,782 A | | 2/1991 | Luciani ................... 242/1.1 R |
| 5,528,822 A | | 6/1996 | Ponzio et al. ................ 29/736 |
| 5,664,317 A | | 9/1997 | Ponzio et al. ................ 29/596 |

FOREIGN PATENT DOCUMENTS

| JP | 58224545 A | 12/1983 |
| JP | 2000069723 A | 3/2000 |
| JP | 2000116078 A | 4/2000 |

OTHER PUBLICATIONS

U.S. Appl. No. 09/522,228, filed Mar. 2000, Becherucci, et al.

* cited by examiner

Primary Examiner—Carl J. Arbes
Assistant Examiner—Tim Phan
(74) Attorney, Agent, or Firm—Fish & Neave LLP; Edward M. Arons; Stuart W. Yothers

(57) ABSTRACT

Insertion devices may be used to insert portions of pre-wound coils into the slots of dynamoelectric machine components. Some machine components may have poles that have pole tips that extend away from the pole in a peripheral direction. Such pole tips may obstruct access to the slots from the axial region of the bore. The coil insertion devices may have a ram that has a longitudinal axis and may be configured to insert a portion of a stretch of pre-wound coil into a bore of the machine component. The coil insertion devices may have pushing members that move in a direction having a circumferential component with respect to the axis. The pushing members may insert portions of stretches of pre-wound coils into machine component slots that are difficult to access from the axial region of the bore.

16 Claims, 5 Drawing Sheets

METHODS FOR FORMING STATOR COILS

This claims the benefit of U.S. Provisional Patent Application No. 60/270,302, filed Feb. 20, 2001, which is hereby incorporated by reference herein in its entirety.

BACKGROUND OF THE INVENTION

The present disclosure concerns apparatus and methods for manufacturing components of dynamoelectric machine components. For example, the apparatus and methods may be used in the manufacture of stators for induction motors. The apparatus and methods may include solutions for inserting pre-wound coils in the slots of dynamoelectric machine components. Similar examples of machine components in which wire coils may be inserted have been described in Ponzio et al. U.S. Pat. Nos. 5,528,822 and 5,664,317, which are hereby incorporated by reference herein in their entireties.

Wire coils are commonly required in two-pole stators. A two-pole stator comprises a bore with two poles that may be diametrically opposite each other inside the bore. The two-pole stator is one of many types of machine components for which the apparatus and methods of the present disclosure may provide coil insertion solutions. In one known method for providing stators with wire coils, the poles of the stator may be wound by wire dispensing needles that move around the poles according to the principles described in Luciani et al. U.S. Pat. No. 4,991,782, which is hereby incorporated by reference herein in its entirety. Methods and apparatus involving wire dispensing needles that move around the poles may require the use of coil support members to support portions of a coil that extend beyond a pole during the winding process.

Pre-wound coils for stators may be initially formed from wire by winding the wire around a template with a rotating wire dispensing flyer. The coil may then be removed from the template and drawn into the stator. Pre-wound coils may have higher coil density than coils wound directly on a pole by dispensing needles. Examples of pre-wound coil forming technology are described in copending Becherucci et al. U.S. patent application Ser. No. 09/522,228, filed Mar. 9, 2000, which is hereby incorporated by reference herein in its entirety.

Some poles have pole tips that reach outward in a peripheral direction, perhaps following the contour of the outer edge of the bore. When such pole tips are present in a stator, it may be difficult to insert a pre-wound coil in the slots adjacent the poles, because access to the slots from the axial region of the bore may be obstructed or partly obstructed by the pole tips.

Therefore, it would be desirable to provide improved apparatus and methods for inserting a portion of a wire coil into a machine component slot. It would also be desirable to provide apparatus and methods for inserting a portion of a pre-wound coil into a machine component slot that is difficult to access from the axial region of the bore.

SUMMARY OF THE INVENTION

It is an object of the invention to provide apparatus and methods for inserting a portion of a wire coil into a machine component slot. It is a further object of the invention to provide apparatus and methods for inserting a portion of a pre-wound coil into a machine component slot that is difficult to access from the axial region of the bore.

In accordance with the principles of the invention, apparatus and methods for inserting a portion of a stretch of a pre-wound coil into a slot of a dynamoelectric machine component may be provided. The apparatus may include a ram that may have a longitudinal axis. The ram may be configured to insert the portion of the stretch into the bore. The apparatus may include a pushing member configured to push the portion into the slot by moving from a first position to a second position. The first and second positions may be separated by a displacement having a circumferential component with respect to the ram axis.

BRIEF DESCRIPTION OF THE DRAWINGS

The above and other objects and advantages of the invention will be more apparent upon considering the following detailed description taken in conjunction with the accompanying drawings, in which like reference characters refer to like parts throughout, and in which.

DETAILED DESCRIPTION OF THE INVENTION

Figure 1:
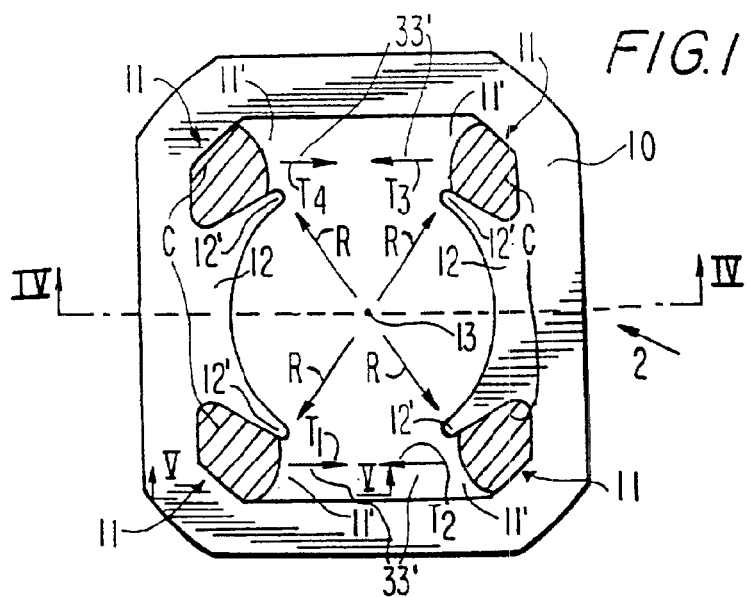
FIG. 1 is a plan view of a stator showing pre-wound coils in sectional view (as taken from a line such as I—I in FIG. 2) inserted, in accordance with the principles of this invention, in the stator slots.

The invention may provide apparatus and methods for inserting a pre-wound coil into a slot of a dynamoelectric machine component. The machine component may have one, two or more poles. Each pole may have one or more slots adjacent the pole. The machine component may have a bore having a longitudinal axis. The machine component may have longitudinal end faces. In some embodiments, the pre-wound coil may be pushed into the bore. In some embodiments, the coil may be pulled into the bore. Some embodiments of the invention may include a ram, which may have a longitudinal axis, configured to insert a portion of a stretch of the pre-wound coil into the bore. In some embodiments of the invention, the ram may have one or more features for maintaining alignment of the coil during insertion. For example, the ram may include a groove, a channel, a guide, or any other feature suitable for maintaining coil alignment.

In some embodiments, the invention may include at least one pushing member configured to push the stretch portion into the slot. The pushing may occur by moving from a first position to a second position. The first and second positions may be separated by a displacement having a circumferential component with respect to the ram axis.

In some embodiments, at least a portion of the pushing member, when located in the first position, may be disposed closer to the ram axis than the maximum radial extent of the ram. For example, the ram may comprise a recess in which the pushing member, or a portion thereof, may be disposed. In some embodiments comprising a recess, the pushing member may move in and out of the recess. In some embodiments of the invention, no portion of the pushing member, when located in the first position, may be disposed closer to the ram axis than the maximum radial extent of the ram.

In some embodiments, the pushing member may move radially toward the ram axis. In some embodiments, the pushing member may move radially away from the ram axis. In some embodiments, the pushing member may move in a direction having a circumferential component with respect to the ram axis.

In some embodiments, the pushing member may be tapered. In some of these embodiments, the pushing member may be narrow at the top and wide at the bottom. During insertion, a portion of a pre-wound coil that is destined to extend beyond a longitudinal end face of the machine component may lean toward the center of the ram. This portion may be referred to as a "bridge portion" or a "transverse portion." The leaning portion may interfere with the positioning of the pushing member. The pushing member taper may reduce or eliminate this interference. In some embodiments, the coil portion may lean in another direction. The amount and direction of taper may be selected to prevent interference with the positioning of the pushing member. For example, the pushing member may have a tapering surface that faces generally in a radial, non-radial, or circumferential direction or in a radially inward direction.

In known needle-based winding technologies, individual wire stretches may be deposited directly on a pole. In these technologies, a support member may be required to support wire stretches destined to become part of a bridge-like portion against tension induced in the wire by a winder. This support member may not be present in some embodiments of the present invention.

Some embodiments of the invention may include at least one stationary blade that may support the machine component. The stationary blade may have a bevel configured to align the machine component bore on the apparatus. The stationary blade may guide a coil stretch as it is being inserted into the bore. The invention may include a base that may support the stationary blade.

Some embodiments of the invention may include at least one moveable blade. In some of these embodiments, the moveable blade may be used to insert the pushing member at least partially into the bore. In some of these embodiments, the pushing member and moveable blade may be positionable with respect to the bore using a common actuator. The pushing member may be moveably coupled to the moveable blade. The pushing member may be coupled to the moveable blade in any suitable way that allows the pushing member to move from the first position to the second position. For example, the pushing member may be attached to the moveable blade by a pin or pins, a hinge, a tongue-and-groove assembly, or any other suitable mechanism. In some embodiments, the pushing member may be mechanically linked to the moveable blade through a cam mechanism.

In some embodiments of the invention, at least a portion of the pushing member, when located in the first position, may be disposed closer to the ram axis than the maximum radial extent of the moveable blade. For example, the moveable blade may comprise a recess or aperture in which the pushing member, or a portion thereof, may be disposed. In embodiments comprising a recess or aperture, the pushing member may move in and out of the recess or aperture. In some embodiments of the invention, when the pushing member moves from the first position to the second position, the pushing member may be radially outside the moveable blade, the stationary blade, or both.

In some embodiments, the pushing member may be inserted into the bore at the same time (or at nearly the same time) as a coil stretch is inserted into the bore (i.e., the coil stretch and the pushing member may be "substantially simultaneously" inserted into the bore). In some embodiments, the insertion of selected insertion tool components (e.g., ram, pushing member, moveable blade, etc.) may be staggered in time, may occur at different rates, or may be both staggered and inserted at different rates. Positioning and insertion of selected components may be independently controlled.

For example, the ram, the pushing member, and the moveable blade may each be capable of independent insertion into the machine component bore. This may be accomplished by coupling each component to an independently controllable actuator. Each actuator may then be used to insert a respective component into the bore at a desired time. In some of these embodiments, each actuator may be operated at a desired rate or in a desired sequence with respect to the other actuators. The use of actuators to insert the components into the bore is just one possible method for inserting apparatus components into the bore of a machine component.

In some embodiments of the invention, the ram, pushing member, moveable blade, and any other suitable insertion tool components may be coupled to a positioning control system. In some embodiments, component positioning and control may be accomplished by positioning axes that may be numerically controlled. The axes may comprise motor driven drivescrew-sleeve mechanisms. In some embodiments of the invention, synchronization may be achieved by closed loop numerical controls and closed loop speed controls. In some embodiments, component positioning and control may involve the positioning of an axis corresponding to an insertion tool component at a selected position using a look-up table.

In some embodiments, the invention may include a forming tool configured to press a portion of the coil into a desired form after the coil is inserted in the slot. The forming tool may be positioned adjacent a longitudinal end face of the machine component. The forming tool may be configured to move radially with respect to the machine component axis. In some embodiments, the invention may include a reaction die disposed opposite the forming tool. The reaction die may be disposed at a greater radial distance from the machine component axis than the forming tool. The reaction die may be configured to compress a portion of the coil. In some embodiments, the reaction die may be maintained in a fixed position while the forming tool moves radially outward. In some of these embodiments, the forming tool may be configured to compress the portion of the coil against the reaction die.

Illustrative examples of embodiments in accordance with the principles of the present invention are shown in FIGS. 1–9.

FIG. 1 shows two-pole stator core 10 having slots 11 on each side of pole structures 12. Some embodiments of the invention may be configured to insert coil portions into stators having more than two poles.

Slot openings 11' do not necessarily face center 13 of the stator core. For example, slot openings 11' of slots 11 may face directions T1–T4, which do not extend toward center 13 of the stator core. Tips 12' of poles 12 obstruct purely radial access to slots 11. The radial direction is illustrated by arrows R. Portions of pre-wound coils C have been inserted in slots 11.

Figure 2:
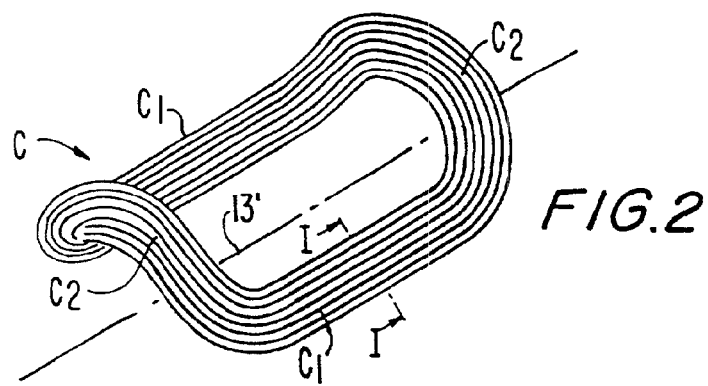
FIG. 2 is a perspective view of one of the pre-wound coils shown in FIG. 1 taken from direction 2 of FIG. 1, as the coil would appear if removed from the stator.

FIG. 2 shows illustrative coil C as it would appear as viewed from direction 2 of FIG. 1, but after removal from the stator core. Coil C may comprise longitudinal stretches C1, which, when received in respective slots 11, are parallel, or nearly parallel, to longitudinal axis 13' of stator 10. Axis 13' may pass through stator center 13 and is perpendicular to the page containing FIG. 1. When coil C is present in stator 10, curved portions C2 may be adjacent opposite end faces (e.g., 45 and 46, shown in FIG. 4) of stator 10. Curved portions C2 may be located outside slots 11, and may form a bridge portion between longitudinal stretches C1.

Figure 3:
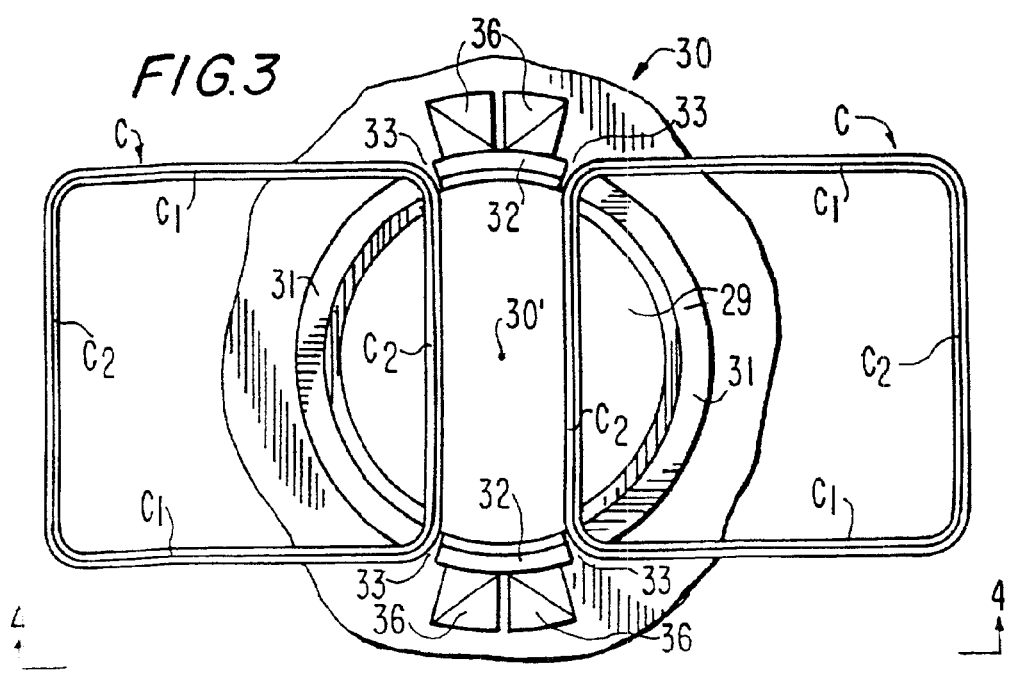
FIG. 3 is a partial plan view of apparatus that may be used in accordance with the principles of this invention.

FIG. 3 shows two coils C placed on insertion tool 30. (The coils, which may have been wound using a template, have yet to be formed by insertion into stator 10.) Insertion tool 30 may comprise one or more stationary blades 31, one or more moveable blades 32, one or more pushing members 36, and one or more gaps 33. Gaps 33 may be defined by the spaces between stationary blades 31 and moveable blades 32. In embodiments that do not include moveable blades, gaps 33 may extend between neighboring edges of stationary blades 31. The size of gaps 33 may be adjusted to receive coils of different sizes. Insertion tool 30 may have insertion tool axis 30'. Insertion tool axis 30' may coincide with ram axis 35" (shown in FIG. 4) and stator axis 13' (shown in FIG. 2). FIG. 3 shows that stationary blades 31 and moveable blades 32 may have radially internal features (with respect to insertion tool axis 30'). These features are described in more detail in FIG. 4. Stationary blades 31 and moveable blades 32 may define insertion tool bore 29.

Figure 4:
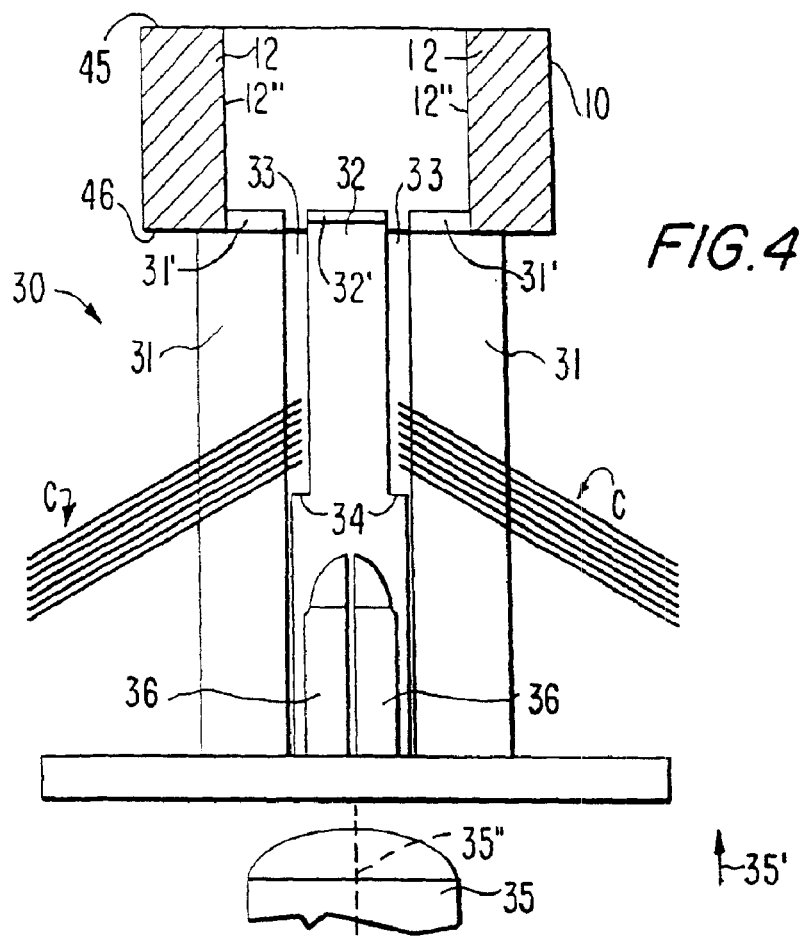
FIG. 4 is an elevational view of the apparatus shown in FIG. 3 taken from line 4—4 of FIG. 3 showing in section a portion of the stator of FIG. 1 as viewed from line IV—IV of FIG. 1 and, schematically, pre-wound coils.

FIG. 4 shows that gaps 33 may separate blades 31 from blades 32, along at least a portion of their height. Portions of coils C (shown in pre-insertion form), such as C1 (shown in FIG. 2) may be received in gaps 33 and may rest on shelves 34 at the bottom of gaps 33. A coil portion that lies within bore 29 may, after insertion in stator 10, become one of the stretches C2 shown in FIG. 2. A coil portion that lies outside bore 29 may, after insertion in stator 10, become an opposite one of the stretches C2 shown in FIG. 2.

FIG. 4 shows stator core 10 placed on top portions 31' of stationary blades 31. Stator core 10 may be seated on a radially outer portion of top portions 31'. Top portions 31' may have a bevel that engages the ends of poles 12 in order to center stator core 10 on insertion tool axis 30'. Each of moveable blades 32 may comprise a bevel 32'. When stator core 10 is centered on insertion tool axis 30', gaps 33 may be aligned with areas 33' (shown in FIG. 1), which are near openings 11'. Stationary blades 31 may be aligned with and extend down from inner surfaces 12" of poles 12. Ram 35 may be passed through bore 29 by moving ram 35 in upward direction 35' so that coils C may be inserted inside the stator core as shown in FIGS. 5 and 6.

Figure 5:
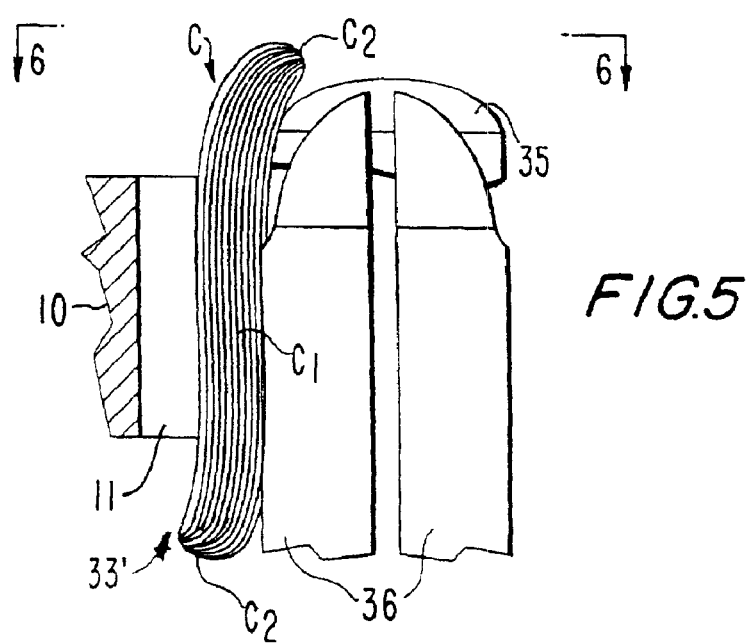
FIG. 5 is a sectional view of a portion of the stator shown in FIG. 1 taken from line V—V of FIG. 1 (line V—V is positioned at the inner edge of the stator, but is shown slightly offset for the sake of clarity) showing portions of the apparatus shown in FIG. 3 and a coil at a stage of insertion different from that shown in FIG. 1.

FIG. 5 shows coil C inserted in stator core 10 after ram 35 has accomplished its complete movement in upward direction 35'. When ram 35 moves in direction 35', it may contact coils C positioned as shown in FIG. 4. Ram 35 may then push coils C to the position shown in FIGS. 5 and 6 as a result of continued motion in direction 35'. During the movement of ram 35, coils C may be guided by stationary blades 31 (shown in FIG. 4). In this way, stationary blades 31 may provide support to coils C by acting as running and/or positioning surfaces to bring the coils into areas 33' (shown in FIGS. 1, 5, and 6).

Moveable blades 32 may be moved parallel to direction 35'. Moveable blades 32 may move synchronously with ram 35 to guide coils C as they move to reach the positions shown in FIGS. 5 and 6. The movement of moveable blades 32 may reduce stress on the coils C while coils C run along stationary blades 31 to reach the position shown in FIGS. 5 and 6. In some embodiments of the invention not having moveable blades, the ram may have one or more features, as described above, for providing support to, and maintaining alignment of, coils C.

Figure 6:
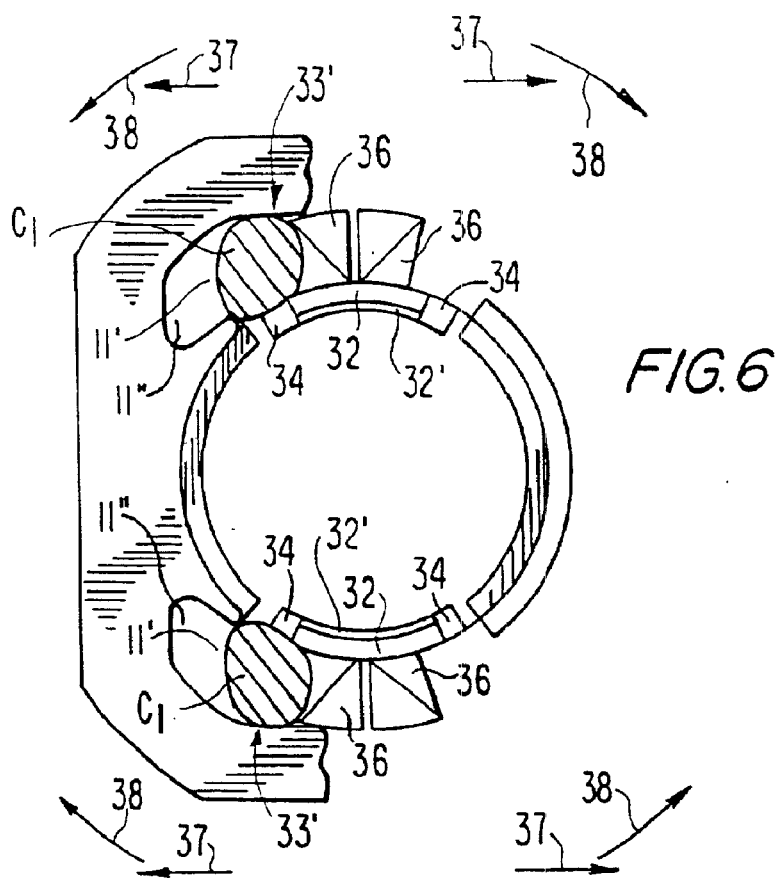
FIG. 6 is a plan view of portions of the apparatus shown in FIG. 3 taken from line 6—6 of FIG. 5 showing a portion of the stator shown in FIG. 1 and a pre-wound coil (shown in sectional view for simplicity)

FIG. 6 shows that after insertion in stator 10 coils C have longitudinal stretches C1 aligned with openings 11' of slots 11. Portions C2 of coils C are positioned near longitudinal end faces 45 and 46 of the stator core (as shown in FIG. 5). FIG. 6 shows that pushing members 36 may be positioned adjacent longitudinal stretches C1 (also shown in FIG. 5). In some embodiments, pushing members 36 may be inserted into stator 10 in concert with ram 35 in direction 35'. In some embodiments, pushing members 36 may be inserted into stator 10 in concert with moveable blades 32 in direction 35'.

Figure 7:
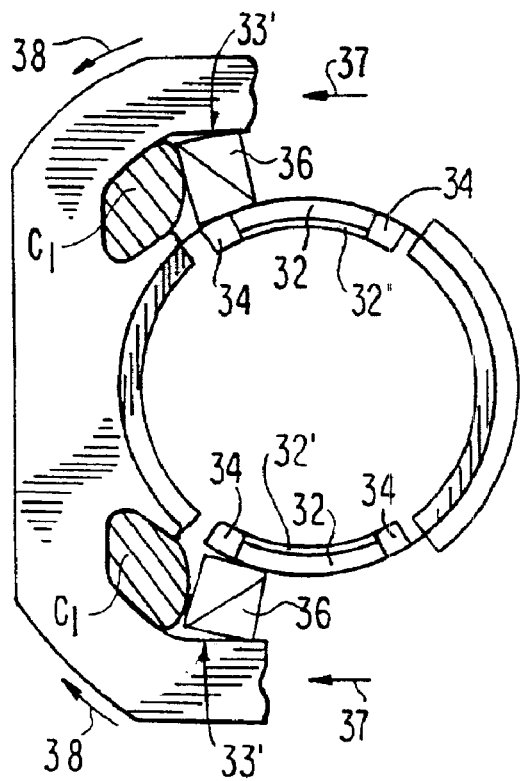
FIG. 7 is a view similar to FIG. 6 showing a different stage in the operation of the apparatus.

Pushing members 36 may be used to push coils C into slots 11. Pushing members 36 may be used to push coils C towards bottoms 11" of slots 11. Pushing members 36 may be moved along straight paths, for example, along directions 37. Pushing members 36 may be moved along curved paths, for example, along directions 38. In some embodiments of the invention, one or more pushing members may move along a curved path and one or more pushing members may move along a straight path. FIG. 7 shows that pushing members 36 may push coil stretches C1 beyond openings 11' and firmly into slots 11.

Figure 8:
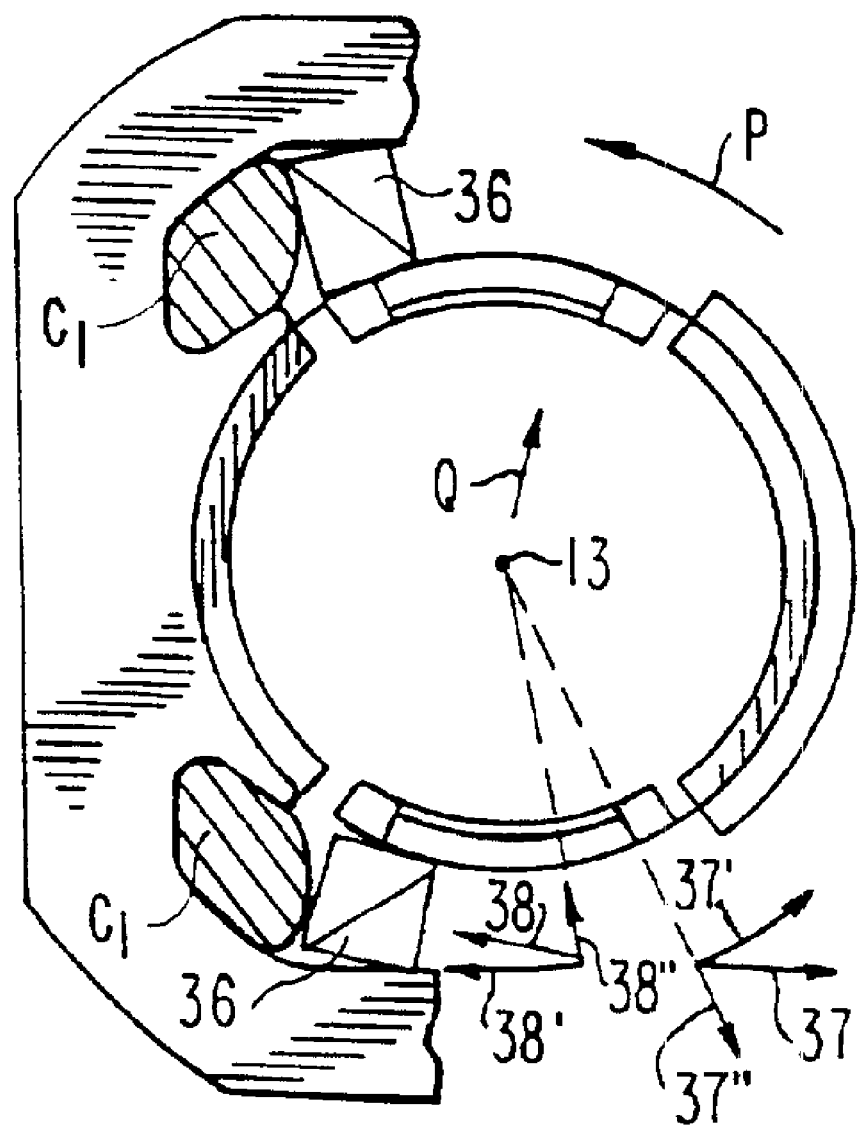
FIG. 8 is a view similar to FIG. 7 showing some possible components of motion of portions of the apparatus.

FIG. 8 shows examples of directions 37 and 38 having circumferential components 37' and 38', respectively, and radial components 37" and 38", respectively. Any of the directions 37 and 38 shown in FIG. 6 may have circumferential and/or radial components. (Similarly, slot openings such as slot openings 11' shown in FIG. 1 may be said to face in a direction having a circumferential component.) Purely circumferential motion and purely radial motion are illustrated by arrows P and Q, respectively. Motion having a circumferential component may be referred to as "non-radial" motion. For example, movement about center 13 in a plane parallel to a plane containing the axial view of the stator core (such as the plane of FIG. 8) may be referred to as "non-radial" motion.

Figure 9:
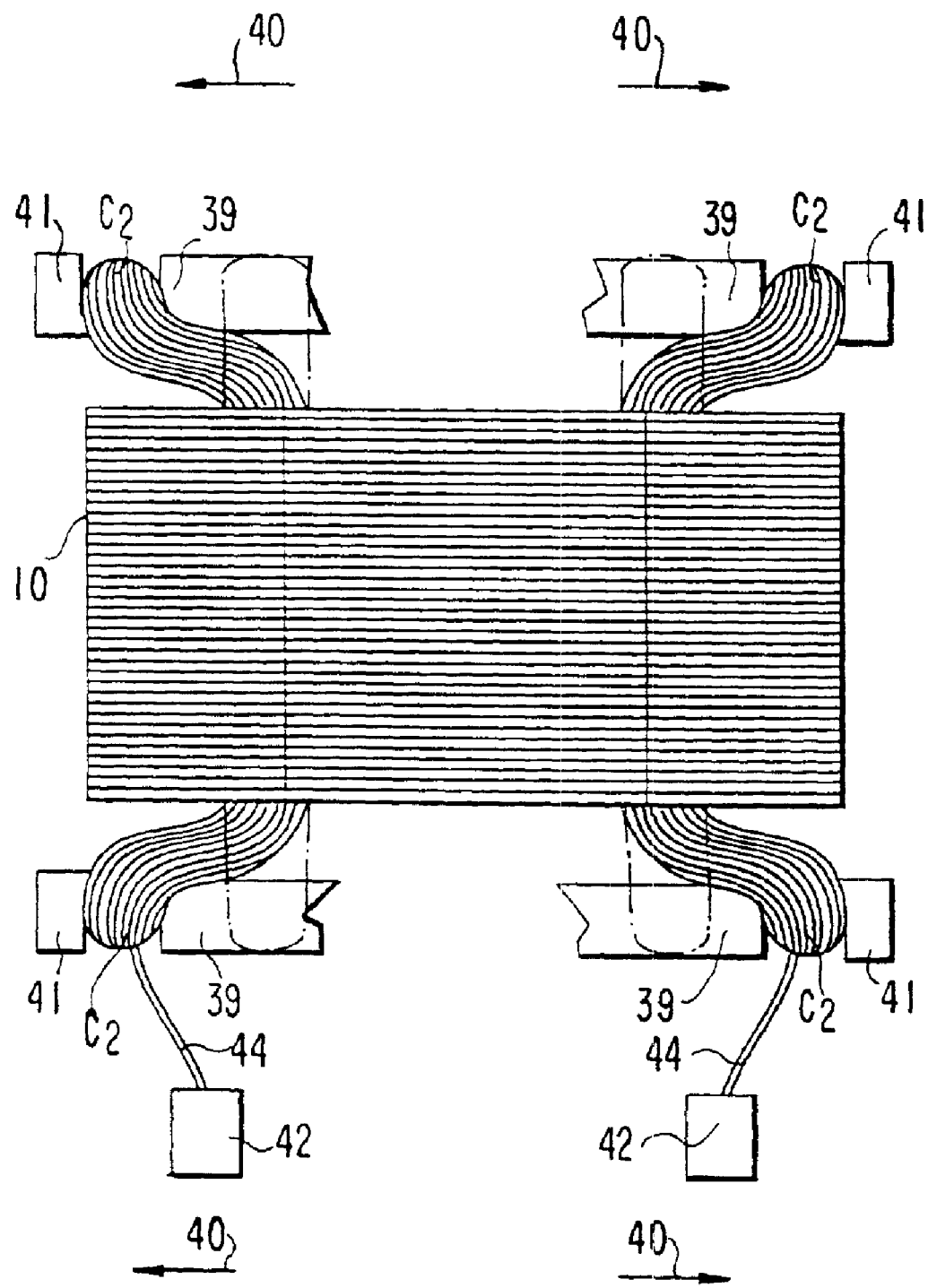
FIG. 9 is an elevational view of apparatus in accordance with the principles of the present invention that may be used in conjunction with the apparatus shown in FIG. 3 showing a stator and pre-wound coils.

FIG. 9 shows that, after stretches C1 are inserted in slots 11, stretches C2 of the coils may be pressed with forming tools 39 into a curved form. (The curved form is also shown in FIG. 2). Forming tools 39 may press coil stretches C2 into the curved form by pushing each coil stretch C2 in a respective direction 40. Dashed lines show the forms of stretches C2 as they would appear prior to the action of forming tools 39 (as shown also in FIG. 5).

Reaction dies 41 may be present to resist coil stretches C2 during outward push 40. The compression of stretches C2 which results from the actions of tools 39 and corresponding dies 41 may compact stretches C2 to a predetermined degree. After forming stretches C2 according to these principles, coil stretches C2 may be laced or bound with strip or chord materials.

FIG. 9 shows leads 44 of coils C. Leads 44 may comprise initial, intermediate, or final wire segments of coils C. Each of leads 44 may be connected to a seal (not shown) in a respective terminal block 42. In some embodiments, leads 44 may be terminated to the terminal blocks prior to the insertion of the coils into the stator core by using the devices and principles described in copending Becherucci et al. U.S. patent application Ser. No. 09/522,228, filed Mar. 9, 2000, which is hereby incorporated by reference herein in its entirety. Leads 44, when connected to terminal blocks 42, may move with coils C when portions of coils C are pushed by ram 35 or pushing members 36 to become seated in slots 11. Having the leads connected to the terminal blocks and suspended from the coils as shown in FIG. 9 (but omitted in the other FIGS. for sake of clarity) may render more efficient and less time consuming successive operations for connecting the stator core to an electric supply as described in copending Becherucci et al. U.S. patent application Ser. No. 09/522,228, filed Mar. 9, 2000, which is hereby incorporated by reference herein in its entirety.

The foregoing has made reference to forming and inserting a portion of one coil C for each pole 12 of the stator core. It may be desirable to include more than one coil for each pole, for example, when a coil of a different wire size needs to be adjacent to a main coil within slots 11 (e.g., when brake coils are needed to stop rotation of a rotor driven by a main coil). Some embodiments of the invention may be used to insert more than one coil for each pole of the stator core. Additional coils may be wound on templates prior to or after winding one or more main coils. The additional coils may be placed with the main coils in gaps 33 and may be inserted in slots 11 together with the main coils by the pushing action of ram 35 and pushing members 36 described in the foregoing.

Some embodiments of the invention may provide separate insertion operations for main and additional coils. For example, a main coil for each pole may be inserted into the stator core slots by means of insertion tool 30. Insertion tool 30 may then be made to receive an additional coil or coils for each pole and insert the additional coil or coils into the stator core slots.

Thus it is seen that improved apparatus and methods for inserting a portion of a wire coil into a machine component slot have been provided. Apparatus and methods for inserting a portion of a pre-wound coil into a machine component slot that is difficult to access from the axial region of the bore have been provided. One skilled in the art will appreciate that the present invention can be practiced by other than the described embodiments, which are presented for purposes of illustration and not of limitation, and the present invention is limited only by the claims which follow.

What is claimed is:

1. A method for inserting a portion of a stretch of a pre-wound coil into a slot of a dynamoelectric machine component, the machine component having a bore and a longitudinal axis, and the portion of the stretch consisting of a plurality of substantially parallel wire lengths, the method comprising:
   inserting the portion of the stretch into the bore wherein the portion of the stretch is located in a first position; and
   pushing the portion of the stretch into the slot wherein all of the wire lengths are displaced from the first position in a common direction having a circumferential component with respect to the axis.

2. The method defined by claim 1 wherein the inserting comprises:
   pushing the portion of the stretch into the bore; and
   guiding the coil with a stationary blade.

3. The method of claim 1 further comprising pressing a portion of the coil into a desired form.

4. The method of claim 3 further comprising compressing the portion of the coil.

5. The method defined by claim 1 further comprising positioning a pushing member in the bore using a moveable blade.

6. The method defined by claim 1 further comprising moveably supporting the coil using a moveable blade during the inserting.

7. The method defined by claim 1 further comprising, when the coil has leads, terminating the leads.

8. A method for inserting a portion of a stretch of a pre-wound coil into a slot of a dynamoelectric machine component, the machine component having a bore and a longitudinal axis, the slot having an opening, the opening facing a direction having a circumferential component with respect to the axis, the portion of the stretch consisting of a plurality of substantially parallel wire lengths, the method comprising:
   inserting the portion of the stretch into the bore wherein the portion of the stretch is located in a first position; and
   pushing the portion of the stretch into the slot wherein all of the wire lengths are displaced from the first position in a common direction along the opening.

9. The method defined by claim 8 wherein the inserting comprises:
   pushing the portion of the stretch into the bore; and
   guiding the coil with a stationary blade.

10. The method of claim 8 further comprising pressing a portion of the coil into a desired form.

11. The method of claim 10 further comprising compressing the portion of the coil.

12. The method defined by claim 8 further comprising positioning a pushing member in the bore using a moveable blade.

13. The method defined by claim 8 further comprising moveably supporting the coil using a moveable blade during the inserting.

14. The method defined by claim 8 further comprising, when the coil has leads, terminating the leads.

15. A method for inserting a coil into a dynamoelectric machine component, the machine component having a bore, a slot, and a longitudinal axis, the method comprising:
   placing the coil onto an insertion tool;
   inserting a portion of a stretch of the coil into the bore, the portion of the stretch consisting of a plurality of substantially parallel wire lengths, wherein the portion of the stretch is located in a first position; and
   pushing the portion of the stretch into the slot wherein all of the wire lengths are displaced from the first position in a common direction having a circumferential component with respect to the axis.

16. The method defined by claim 15 further comprising winding the coil outside the machine component.

* * * * *